United States Patent
Buchanan et al.

(10) Patent No.: US 9,535,189 B2
(45) Date of Patent: Jan. 3, 2017

(54) GENERATING AN ATMOSPHERIC MODEL USING ONE OR MORE PRESSURE-SENSING MOBILE DEVICES

(71) Applicant: BlackBerry Limited, Waterloo (CA)

(72) Inventors: Nathan Daniel Pozniak Buchanan, Waterloo (CA); Robert George Oliver, Waterloo (CA); Adam Louis Parco, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 652 days.

(21) Appl. No.: 13/654,583

(22) Filed: Oct. 18, 2012

(65) Prior Publication Data

US 2014/0114624 A1    Apr. 24, 2014

(51) Int. Cl.
*G06F 17/10* (2006.01)
*G01W 1/02* (2006.01)

(52) U.S. Cl.
CPC ..................................... *G01W 1/02* (2013.01)

(58) Field of Classification Search
USPC .......................................................... 702/3
See application file for complete search history.

(56) References Cited

U.S. PATENT DOCUMENTS

| 7,324,002 | B2 | 1/2008 | Iso-Heiko et al. | |
|---|---|---|---|---|
| 2005/0134467 | A1* | 6/2005 | Iso-Heiko et al. | 340/601 |
| 2006/0100782 | A1 | 5/2006 | Levi et al. | |

(Continued)

FOREIGN PATENT DOCUMENTS

| DE | 20003823 U1 | 8/2000 |
|---|---|---|
| DE | 202004019542 U1 | 3/2005 |

(Continued)

OTHER PUBLICATIONS

BOSCH—May 2011—Navigation accurate to the nearest floor; Pressure sensor BMP180 provides the required altitude information—MEMS pressure sensor for mobile devices.

(Continued)

*Primary Examiner* — Tung Lau
(74) *Attorney, Agent, or Firm* — Moffat & Co.

(57) ABSTRACT

A mobile device comprising a pressure sensor for collecting pressure data, a position-determining subsystem for generating location data including altitude data, and a processor operatively coupled to a memory to generate an atmospheric model based on the pressure data and the location data. In one implementation, the processor is configured to determine an Above Mean Sea Level (AMSL) altitude using a position-determining subsystem, determine a pressure altitude using the pressure sensor, calculate a difference between the pressure altitude and the AMSL altitude, and calculate a temperature at sea level based on the AMSL altitude and pressure altitude. In one implementation, the processor performs a linear regression on an equation AMSL altitude=offset+ScaleFactor*PressureAltitude to solve for the offset and the ScaleFactor, and then estimates the temperature at sea level as 1-ScaleFactor=(T−15)/3. The model may be used to estimate ambient air temperature or weather conditions.

18 Claims, 6 Drawing Sheets

(56) References Cited

U.S. PATENT DOCUMENTS

2008/0019299 A1* 1/2008 Lekutai .................. G01W 1/02
                                                                                                  370/328
2008/0234928 A1    9/2008 Matsuoka
2014/0114567 A1* 4/2014 Buchanan et al. ............ 701/454

FOREIGN PATENT DOCUMENTS

EP         1467579 A1    10/2004
WO     2008148649 A1    12/2008

OTHER PUBLICATIONS

MEMS pressure sensor: 260-1260 Mbar absolute digital output barometer.
European Search report from EP application No. 12188951.3 dated Dec. 13, 2013.
European Search report from EP application No. 12189122.0 dated Mar. 27, 2013.

* cited by examiner

GENERATING AN ATMOSPHERIC MODEL USING ONE OR MORE PRESSURE-SENSING MOBILE DEVICES

CROSS-REFERENCE TO RELATED APPLICATIONS

This is the first application filed for the present technology.

TECHNICAL FIELD

The present technology relates generally to mobile devices and, in particular, to techniques for determining atmospheric or weather conditions using mobile devices.

BACKGROUND

Mobile devices having wireless data connectivity may obtain real-time weather data over the air from web servers that receive and publish such data from weather services that operate fixed ground-based weather stations. It is also known to receive weather alerts wirelessly. However, one of the recurring problems with this conventional approach is that localized weather conditions where the mobile devices are currently situated may differ rather substantially from the weather conditions measured at the distant ground-based weather stations. A solution to this problem would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
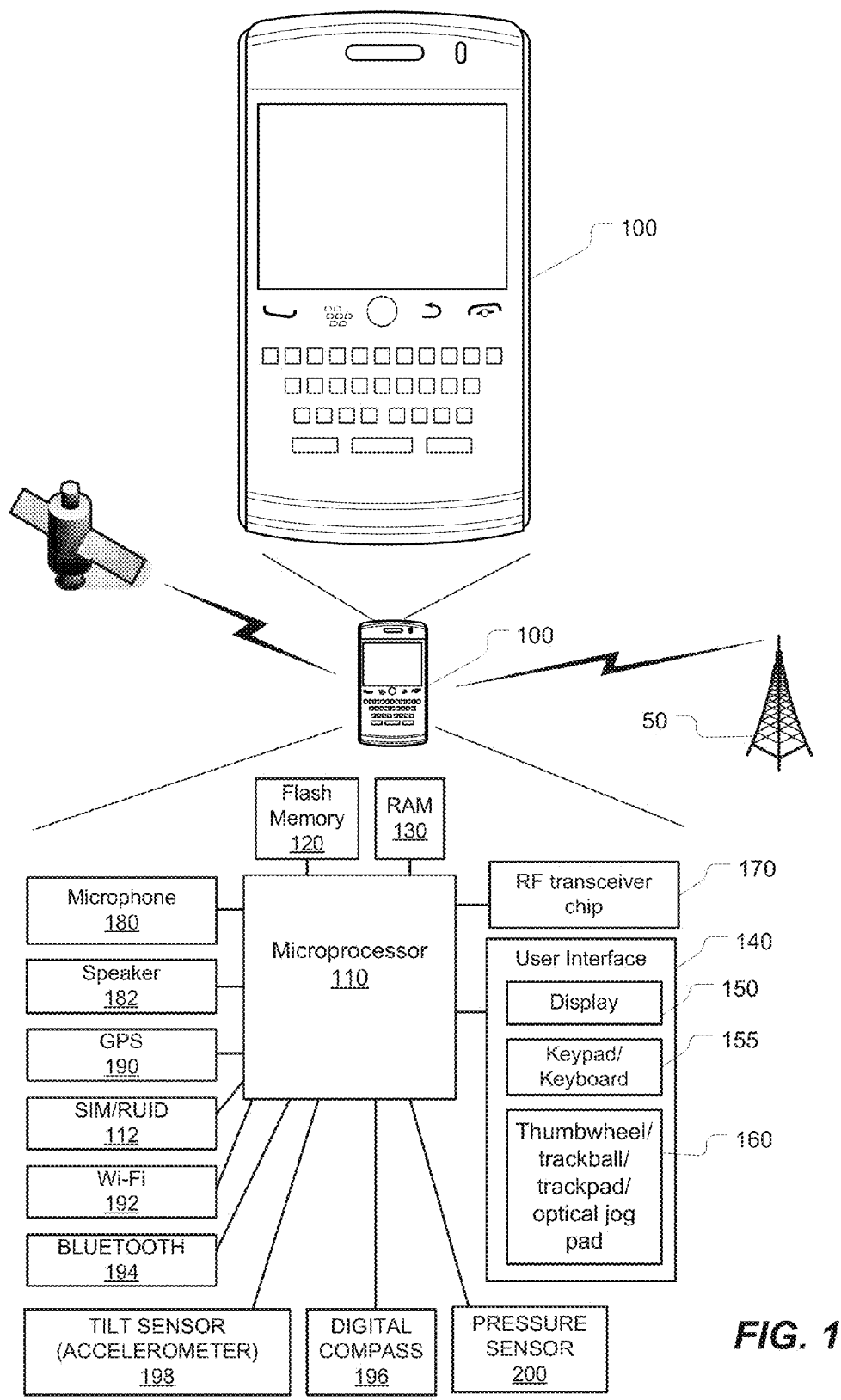
FIG. 1 is a depiction of a mobile device on which the present technology may be implemented, the depiction including a schematic depiction of some components of the mobile device.

The present technology provides a novel way for a mobile device to generate an atmospheric model.

Accordingly, one aspect of the present technology is a computer-implemented method of collecting pressure data and location data at a plurality of locations using one or more mobile devices each having a pressure sensor and a position-determining subsystem, the location data including altitude data, and generating an atmospheric model based on the pressure data and location data. In one implementation, the processor is configured to determine an Above Mean Sea Level (AMSL) altitude using a position-determining subsystem, determine a pressure altitude using the pressure sensor, calculate a difference between the pressure altitude and the AMSL altitude, and calculate a temperature at sea level based on the AMSL altitude and pressure altitude. In one implementation, the processor performs a linear regression on an equation AMSL altitude=offset+ScaleFactor*PressureAltitude to solve for the offset and the ScaleFactor, and then estimates the temperature at sea level as 1-ScaleFactor=(T−15)/3. The model may be used to estimate ambient air temperature or weather conditions.

Another aspect of the present technology is a computer-readable medium comprising instructions in code which when loaded into a memory and executed by a processor of a mobile device cause the mobile device to collect pressure data and location data at a plurality of locations using a mobile device having a pressure sensor and a position-determining subsystem, the location data including altitude data, and then generate an atmospheric model based on the pressure data and location data. In one implementation, the processor is configured to determine an Above Mean Sea Level (AMSL) altitude using a position-determining subsystem, determine a pressure altitude using the pressure sensor, calculate a difference between the pressure altitude and the AMSL altitude, and calculate a temperature at sea level based on the AMSL altitude and pressure altitude. In one implementation, the processor performs a linear regression on an equation AMSL altitude=offset+ScaleFactor*PressureAltitude to solve for the offset and the ScaleFactor, and then estimates the temperature at sea level as 1-ScaleFactor=(T−15)/3. The model may be used to estimate ambient air temperature or weather conditions.

Another aspect of the present technology is a mobile device having a pressure sensor for collecting pressure data, a position-determining subsystem for generating location data including altitude data, and a processor operatively coupled to a memory to generate an atmospheric model based on the pressure data and the location data. In one implementation, the processor is configured to determine an Above Mean Sea Level (AMSL) altitude using a position-determining subsystem, determine a pressure altitude using the pressure sensor, calculate a difference between the pressure altitude and the AMSL altitude, and calculate a temperature at sea level based on the AMSL altitude and pressure altitude. In one implementation, the processor performs a linear regression on an equation AMSL altitude=offset+ScaleFactor*PressureAltitude to solve for the offset and the ScaleFactor, and then estimates the temperature at sea level as 1-ScaleFactor=(T−15)/3. The model may be used to estimate ambient air temperature or weather conditions.

The details and particulars of these aspects of the technology will now be described below, by way of example, with reference to the drawings.

By way of overview, the present technology provides a mobile device, computer-readable medium and computer-implemented method for generating an atmospheric model using pressure and location data (that includes altitude data) collected using sensors on the device.

Device

FIG. 1 is a depiction of a wireless communications device as one example of a mobile device that may be used to implement this novel technology. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the device and its applications. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

The mobile device 100 may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 includes a speech-recognition subsystem that has a microphone 180 for transforming voice input in the form of sound waves into an electrical signal. The electrical signal is then processed by a speech-recognition module (digital signal processor) to determine keywords or phrases from the voice input. Optionally, the mobile device 100 may include a speaker 182 and/or an earphone jack.

Optionally, the mobile device 100 may also include a position-determining subsystem such as a Global Positioning System (GPS) receiver 190 (e.g. in the form of a chip or chipset) for receiving GPS radio signals transmitted from one or more orbiting GPS satellites. Any other Global Navigation Satellite System (GNSS), such as GLONASS or Galileo, may be used for satellite-based positioning. Other position-determining subsystems or techniques may be used, including radiolocation techniques, signal trace techniques, Wi-Fi™ positioning system (WPS), etc. Any combination of these subsystems or techniques may also be used to provide a position fix (current location data) for the device. The position-determining subsystem may provide an altitude reading in addition to latitude and longitude coordinates. For example, GNSS receivers such as a GPS receiver can compute a GPS altitude from signals from four orbiting satellites.

Optionally, the mobile device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

As noted above, a wireless communications device is one example of a mobile device 100 on which the present technology may be implemented. Other mobile devices 100 may include smart phones, cell phones, PDAs, tablets, laptops, palmtops, or any other such devices.

The mobile device 100 also includes a pressure sensor 200. The pressure sensor may be a micro-sensor or microelectromechanical system (MEMS) embedded inside the mobile device. For example, the pressure sensor may be a piezo-resistive pressure sensor with an IC interface such as, for example, the LPS331AP MEMS pressure sensor manufactured and sold by STMicroelectronics NV. This sensor has an absolute pressure range of 260 to 1260 mbar and a resolution of 0.020 mbar RMS. Alternatively, the MEMS pressure sensor may be a BMP180 from Bosch Sensortec GmbH. Any other equivalent pressure sensor may be used. In a variant, an external pressure sensor may be connected to the mobile device via a wired or wireless connection. The pressure sensor 200 provides pressure signals or pressure data to the processor 110 and memory 120, 130 of the mobile device 100, for example, via the IC interface.

Pressure data and location data (including altitude data) may be collected using a single mobile device that moves to different locations over time or by a plurality of mobile devices acting as an ad hoc network. Irrespective of whether the data is collected by one or more devices, the pressure and location data is collected at a plurality of different locations using the one or more mobile devices each being equipped with a pressure sensor and a position-determining subsystem able to provide altitude data as part of the positioning. The mobile device(s) and/or a server, server cluster or cloud operating in connection with the device(s) generates an atmospheric model based on the pressure data and location data. The altitude data may be AMSL or GPS Altitude. These concepts, and some related altitude concepts, are now reviewed to facilitate understanding of this novel technology.

Above Mean Sea Level (AMSL) is the absolute height above the point where the sea level would be if a trench was dug from that point to the sea and sea water was permitted to pass freely between the sea and the trench. This is a gravity-based definition such as the one defined in the Earth Gravitational Model (EGM96).

GPS Altitude is the altitude above or below the WGS84 ellipsoid, a model of the Earth used by GPS. Similar models are used in most GNSS systems. As pressure changes with gravity, GPS altitudes must be converted to AMSL altitudes before applying atmospheric equations.

ISO/US/ICAO Standard Atmosphere is the standard atmospheric model assuming no weather, and the following conditions at 0 AMSL: 15 C, 101325 Pa, 1.98 C/1000 ft lapse rate.

Pressure Altitude is the altitude calculated from pressure assuming ICAO standard atmosphere. No corrections are made for weather or temperature.

Estimated AMSL Altitude is the altitude calculated from pressure correcting for temperature and local weather (high/low pressure regions). This value should equal AMSL Altitude.

Users expect to see AMSL Altitude, that is, a constant altitude for a fixed point that corresponds to a reference point such as sea level. The absolute pressure sensor provides a pressure reading from which Pressure Altitude is easily calculated. Unfortunately, Pressure Altitude may have up to 1000 ft of difference from AMSL Altitude, depending on the current weather, making this value behave differently than expected by the user.

Given a weather model, the Estimated AMSL Altitude can be calculated from the pressure for the current location—this is equal to the desired AMSL Altitude.

It is also possible to obtain an AMSL Altitude and location from GPS (or other position-determining sources such as cellular triangulation, Wi-Fi positioning, NFC, or manual input.) depending on the accuracy of the specific source. In the case of GPS, the altitude would be converted from GPS Altitude to AMSL Altitude.

In general terms, the mobile device 100 generates the atmospheric model by determining an Above Mean Sea Level (AMSL) altitude using a position-determining subsystem (e.g. GPS receiver 190) and determining a pressure altitude using the pressure sensor 200, calculating a difference or delta between the pressure altitude and the AMSL altitude, and then calculating a temperature at sea level based on the AMSL altitude and the pressure altitude, as will be elaborated below.

The calculation of the temperature at sea level may be accomplished in one implementation by performing a linear regression on an equation AMSL altitude=offset+ScaleFactor*PressureAltitude to solve for the offset and the ScaleFactor and by then estimating the temperature at sea level as 1-ScaleFactor=(T−15)/3. Thereafter, the atmospheric model for pressure is generated based on the AMSL altitude and temperature at altitude using a lapse rate of 1.98 C/1000 ft (6.5 C per km).

In one embodiment, the processor of the mobile device is configured to determine the AMSL altitude by obtaining a GPS altitude reading from the GPS receiver 190 in the mobile device. The processor is configured to then convert the GPS altitude to the AMSL altitude.

The processor may be further configured to determine ambient air temperature using the atmospheric model and to cause a display to display the temperature on the mobile device. Additionally or alternatively, the processor may be configured to determine weather conditions using the atmospheric model and to cause a display to display the weather conditions on the mobile device.

Method

Figure 2:
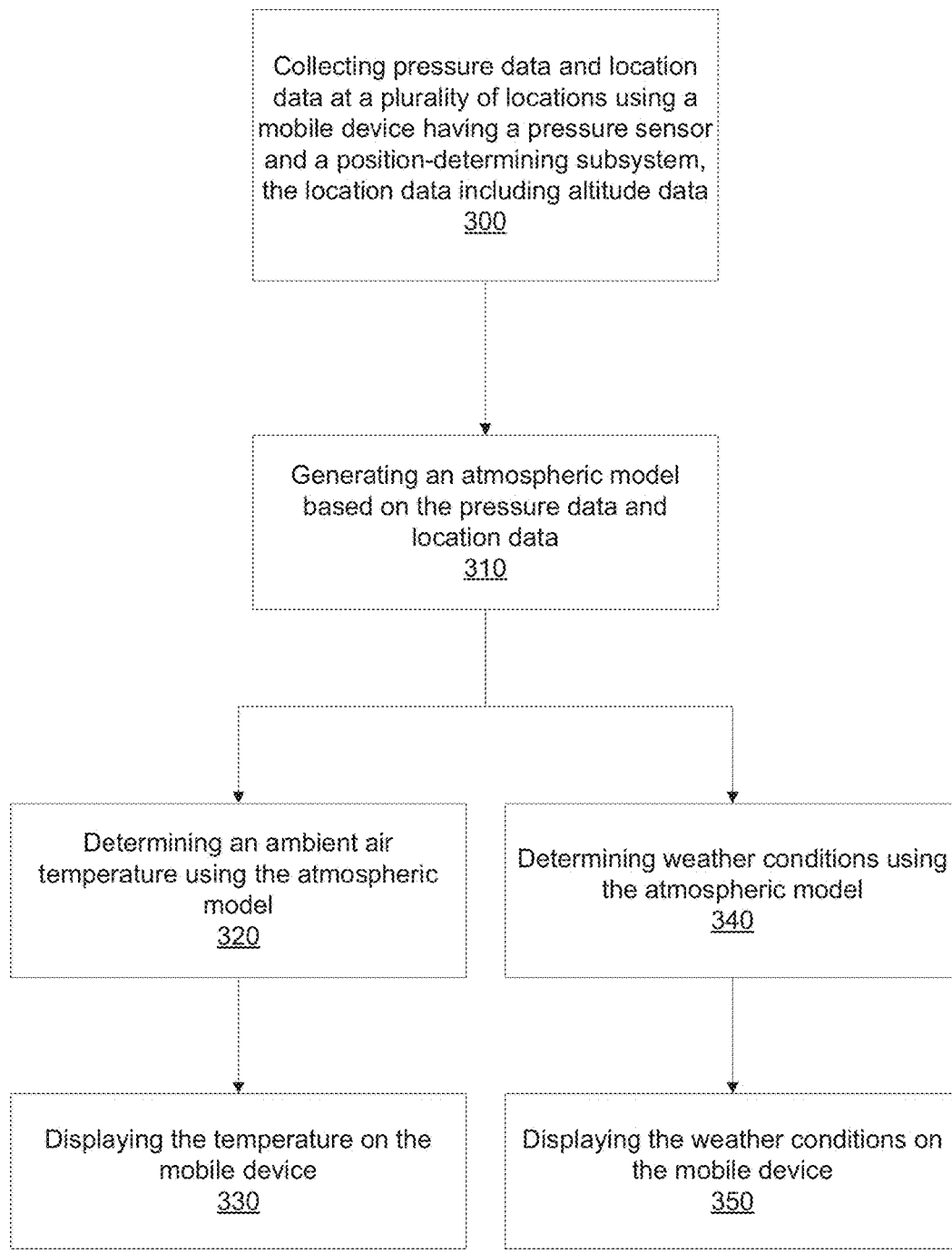
FIG. 2 is a flowchart depicting a computer-implemented method of generating an atmospheric model in accordance with an implementation of the present technology.

Another aspect of the present technology is a novel method of generating an atmospheric model from multiple measurements obtained by one or more pressure-sensing and location-sensing mobile devices. The method utilizes at least one mobile device having a pressure sensor 200 for providing pressure data and a positioning system 190 for providing respective position data. As previously noted, these position-specific pressure measurements may be made using a single mobile device (which moves around to various positions to collect the pressure readings) or from a plurality of mobile devices in an ad-hoc network. In general, as depicted in the flowchart of FIG. 2, the method entails a step 300 of collecting pressure data and location data at a plurality of locations using a mobile device 100 having a pressure sensor and a position-determining subsystem 190 capable of providing altitude data in addition to latitude and longitude data. Position data thus defines the location of the mobile device in three dimensions. The method further entails a step 310 of generating an atmospheric model based on the pressure data and location data. Subsequently, the atmospheric model may be used to determine an ambient air temperature (step 320) and to display this temperature on the device (step 330). Additionally or alternatively, the atmospheric model may be used to determine weather conditions (step 340) and to display the weather conditions on the device (step 350).

Figure 3:
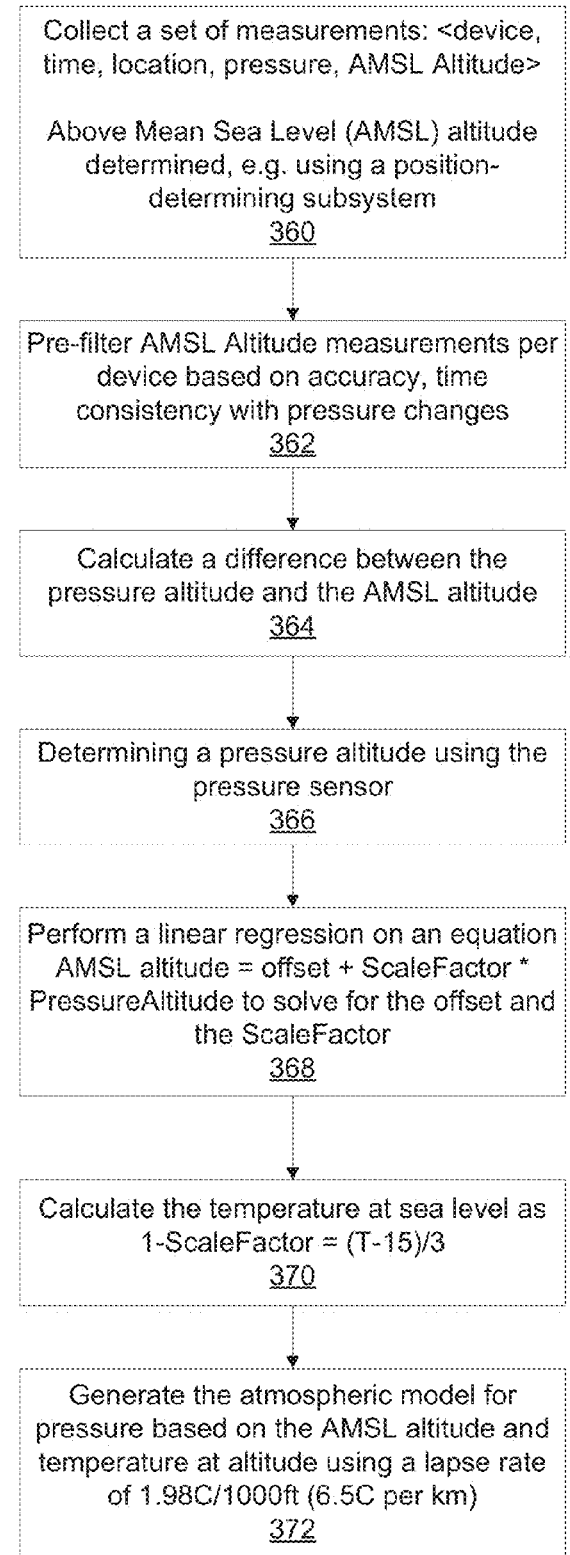
FIG. 3 is a flowchart of one specific implementation of the method of generating an atmospheric model.

In one implementation, the method of generating the atmospheric model proceeds as depicted in the flowchart of FIG. 3:

1. Collect a set of measurements: <device, time, location, pressure, AMSL Altitude>, as shown in step 360. The AMSL altitude may be determined at substep 361 using a position-determining subsystem, e.g. a GPS receiver capable of providing GPS altitude. The GPS position fix may be aided or assisted using Assisted GPS or Aided GPS. The pressure readings obtained using the pressure sensor 200 provide the Pressure Altitude at substep 362.

2. Pre-filter AMSL Altitude measurements per device based on accuracy, time consistency with pressure changes (i.e. reject inconsistent readings), as shown in step 364.

3. For each device, as shown in step 366, calculate or estimate the difference between Pressure Altitude and AMSL Altitude for short periods (assuming the mean location). This difference corresponds to the weather effect and the temperature effect combined, and provides an altimeter setting for that time, location, and altitude.

a) The weather effect is a constant offset, independent of the altitude.

b) The temperature effect is a scale factor on altitude proportional to temperature.

4. As weather effects (low pressure/high pressure regions) usually extend over a large area (which can be any arbitrary area, e.g. ~100 $km^2$ or a 100 km radius or any other area which may be user-configurable), and are generally assumed to be slow to change, choose a set of measurements over the approximate 100 $km^2$ area and over about 0.5 to 1 hour (i.e. 30-60 minutes) or any other suitable time period, which is also user-configurable. Then perform a linear regression (step 368) on the equation AMSL Altitude=offset+ScaleFactor*PressureAltitude and solve for offset and ScaleFactor.

5. Calculate or approximate the temperature at sea level as 1-ScaleFactor=(T−15)/3 at step 370. In another embodiment, a different ScaleFactor equation may be substituted.

6. This produces at step 372 a model for pressure: AMSL Altitude and temperature at altitude (1.98 C/1000 ft) lapse rate, i.e. 6.5 C per km, which is constant up to an altitude of 11 km. In another embodiment, a different lapse rate may be used.

The pressure and location readings that contribute to the generation of the atmospheric model may derive from a single mobile device or from a group or plurality of mobile devices that together constitute an ad hoc network of mobile devices. Computations for the generation of the model may be performed on a server or on one or more of the mobile devices or any combination thereof.

This mobile device may then use this atmospheric model for:

1) providing accurate altimeter settings for pressure altimeters (e.g. altimeters that use the onboard pressure sensor 200 on the mobile device 100) for improved altitude determination or for providing alerts, notifications, content, etc. based on these conditions;

2) estimating an outside or ambient air temperature (which is conventionally very difficult to measure using a temperature sensor in the device due to the significant heat that the device electronics generates), or providing alerts, notifications, content, etc. based on temperature; or 3) determining weather conditions or statistics (e.g. observing pressure trends, predicting weather changes, etc.), or providing alerts, notifications, content, etc. based on these conditions;

In each of these three uses, the atmospheric model provides much more accurate localized pressure and temperature information than what would be available by pulling weather data from web-based weather services that are relying on distant fixed ground-based weather stations. As mentioned above, the atmospheric model enables the device to measure localized temperature and pressure and to provide a variety of functions, settings and content based on temperature and/or pressure and/or weather. For example, the device may deliver content or advertising when the temperature reaches a certain threshold or when certain weather conditions are prevailing. For example, location-based advertising (LBA) may be delivered for cold drinks if the temperature exceeds a certain threshold. As another example, LBA for a sale on umbrellas at a local department store may be delivered if the weather conditions are suggesting rain. Content, alerts, or notifications may be delivered to the mobile device to warn the user of icy road conditions, fog, bad weather, etc. Reminders (alerts) to close the windows in your car or your house may be delivered, to bring in your pet, or to water the lawn. Any of these actions, recommendations, alerts or notifications may be prompted by temperature, pressure or weather data determined locally based on the generated atmospheric model.

In one implementation, the weather data, or just the temperature data and/or pressure data, may be displayed on a map on the mobile device 100. For example, the weather may be displayed graphically with standard or user-configurable icons representing sunshine, clouds, rain, snow, fog, etc. Additionally or alternatively, the map may display numerical values of temperature (in Celsius or Fahrenheit) and/or pressure (in any suitable system of pressure units) at various locations on the map, e.g. at cities or other geographical entities, landmarks or points of interests, etc. The weather icons and/or numerical values of temperature and/or pressure may be interactive interface elements that respond to user input to provide further detail about the local weather conditions, temperature, pressure, etc. . . . For example, touching or clicking on a weather icon may, in one embodiment, cause a detailed weather forecast for the location to be displayed. In another implementation, it may be possible to view all of the mobile devices that are presently collecting and sharing data. In another implementation, the device may interpolate the data to estimate the weather conditions, temperature or pressure at an intermediate location between two nearby locations for which data has been collected. The map data may be downloaded from a map server. This map data may be generated from vector data or bitmaps.

Figure 4:
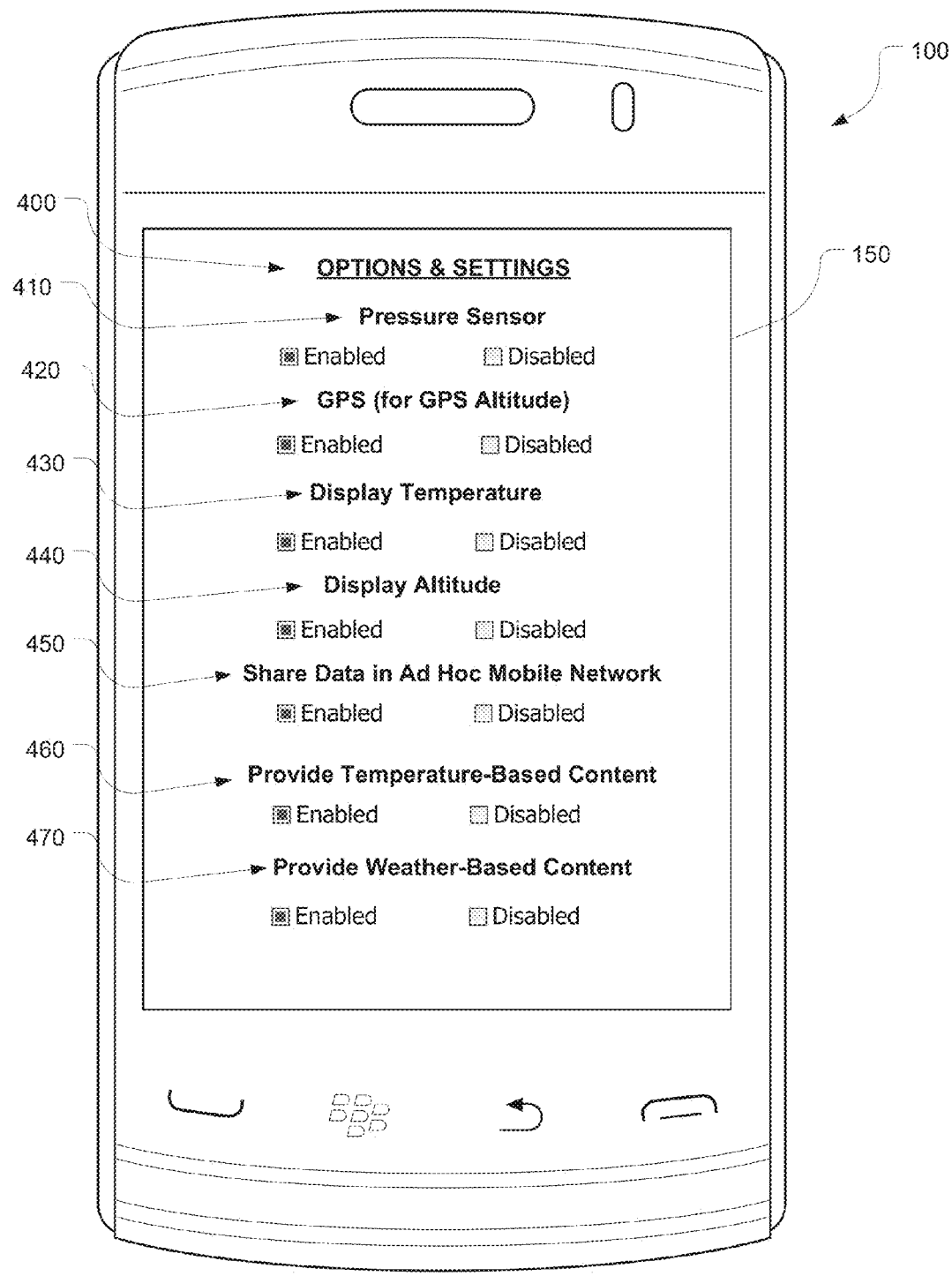
FIG. 4 depicts an options and settings page of a mobile device for use in configuring the manner in which the mobile device interacts with the atmospheric model.

FIG. 4 depicts an example of an options and settings interface 400 of a mobile device that enables the user of the mobile device to configure various options, settings, preferences and features. As depicted by way of example, the options and settings interface is a page 400 displayable on the mobile device in response to a command or user input. As illustrated by way of example in FIG. 4, the options and settings page 400 includes a pressure sensor setting 410, a GPS setting 420, a temperature display setting 430, an altitude display setting 440, and a data-sharing setting 450. In addition, as further depicted by way of example in FIG. 4, the options and settings page 400 may include controls or settings 450, 460 to enable or disable the provision of temperature-based content and/or weather-based content.

Figure 5:
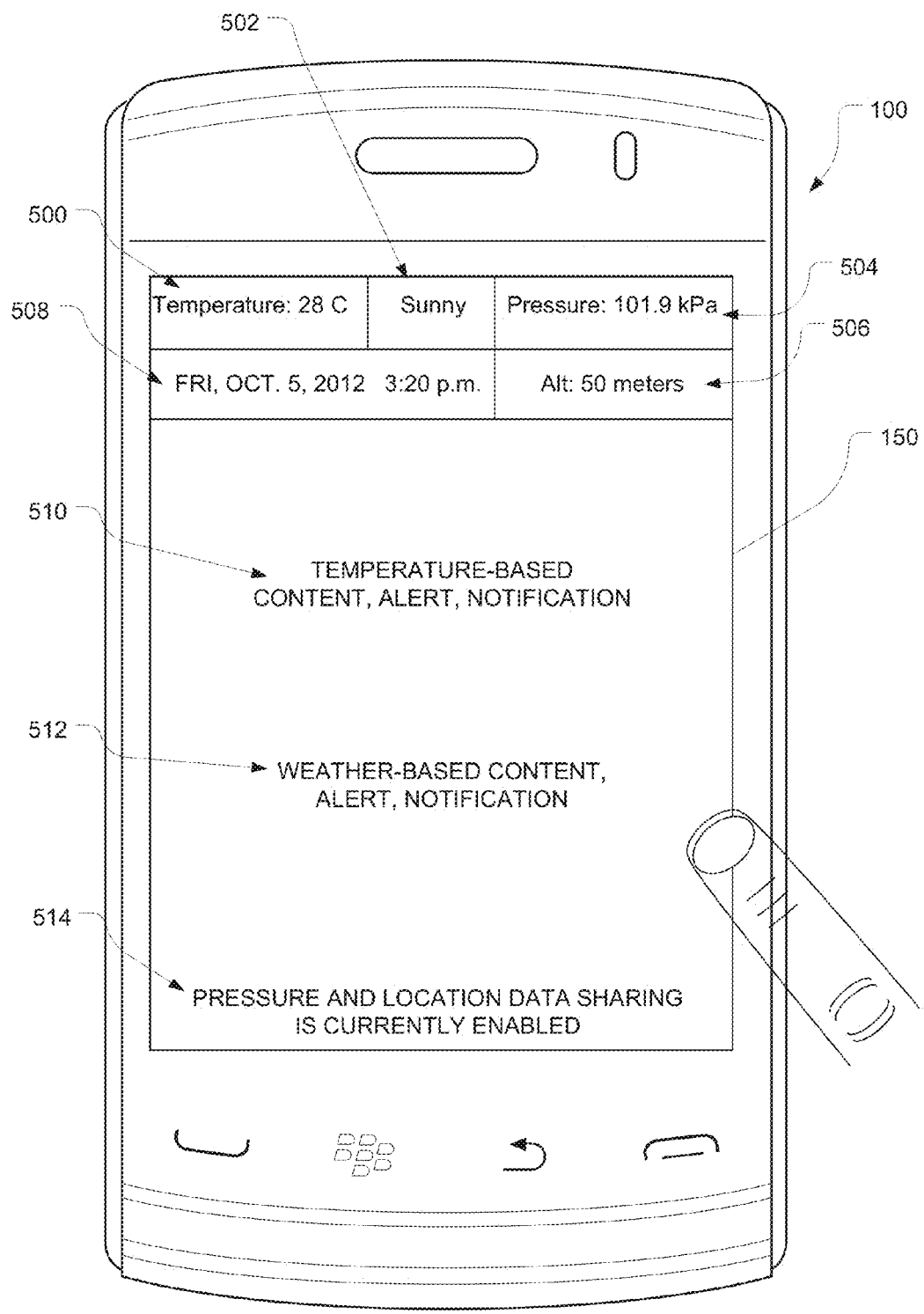
FIG. 5 depicts a user interface of the mobile device displaying temperature, weather, pressure and altitude information obtained using the atmospheric model.

FIG. 5 depicts an example of a user interface of a handheld mobile device 100 that displays on its touch-sensitive display screen 150 various information and content that is created, derived from or based upon the atmospheric model. For example, the mobile device 100 may contain one or more of a temperature display 500, a weather condition display 502, a pressure display 504 and an altitude display 506. These may be displayed in any other manner and may be user-configurable in their layout, presentation, onscreen location, system of units, font, size, etc. In the illustrated embodiment, this temperature, weather, pressure and altitude information, data or readings may be presented in an upper information bar that contains the date and time in a date and time bar 508, for example. In addition, as further depicted by way of example in FIG. 5, the mobile device 100 may display temperature-based content, alerts or notifications 510 and/or weather-based content, alerts or notifications 512. In addition, as further depicted by way of example in FIG. 5, the mobile device may display a status indicator 514 indicating that the device is currently contributing its pressure and location data to ad hoc network of mobile devices for the purposes of generating the atmospheric model. A user-configurable setting, in one embodiment, enables the user to disable location data sharing if privacy is a concern.

It is also to be understood that the atmospheric model in one implementation is continually, periodically, intermittently or dynamically updated as new pressure and location data is collected and becomes available for use in regenerating the model. The new data may be used to incrementally replace data that becomes old or stale over time. The model may thus use a moving time window to refresh the model by continually, periodically or intermittently importing new data and flushing out the oldest data. The time window may be user-configurable.

In addition, the mobile device or plurality of mobile devices in the ad hoc network may share the atmospheric model with a server, server cluster, user group or other local, connected devices.

In the foregoing embodiments, the atmospheric model is generated for a localized area, e.g. 100 square km, by using pressure readings from mobile devices within that localized area. In another embodiment, atmospheric models for adjoining areas may be combined to form larger scale models or composite models of multiple adjoining areas. In other words, a first atmospheric model for a first area may be combined, joined or aggregated with a second atmospheric model for a second area. This concept may be extrapolated so that a plurality of atmospheric models for a plurality of contiguous or adjoining areas are combined or aggregated to produce a large-scale composite atmospheric model covering a much larger area. In theory, this technique may be used to generate a model for all habited areas of the Earth where mobile users are situated.

Figure 6:
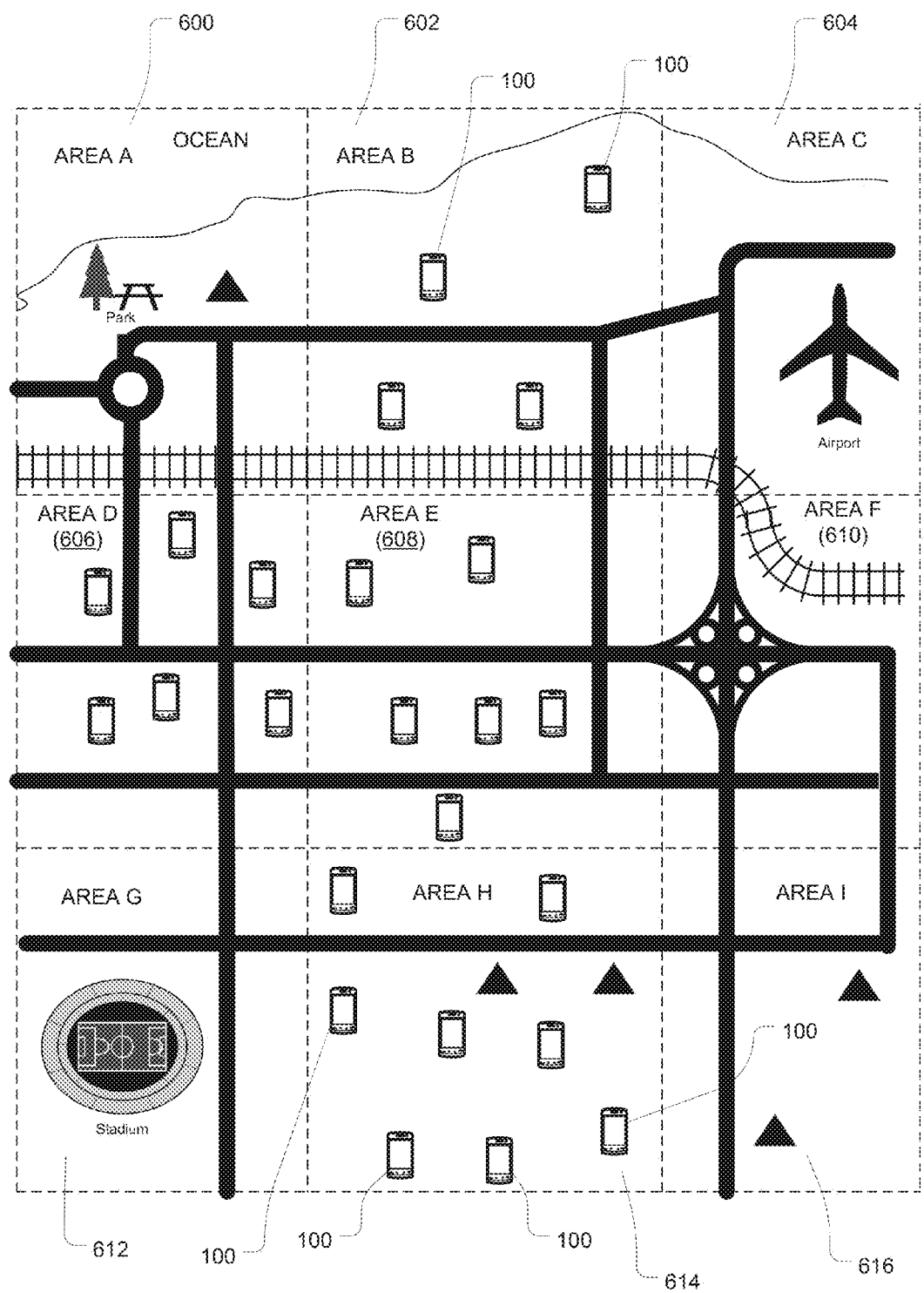
FIG. 6 depicts a map composed of adjoining areas for which a composite atmospheric model is generated in accordance with a further implementation of the technology.

FIG. 6 depicts an example map that further illustrates the concept of creating a composite atmospheric model from a plurality of localized atmospheric models that have been each generated for respective adjoining geographical areas of a map. In the example map of FIG. 6, there are nine adjoining map areas, namely Areas A-I, which are referenced by numerals 600-616. It will be appreciated that the map shown in FIG. 6 is just one example and that the number of map areas may be varied. Each area is shown as rectangular in the example of FIG. 6 but other polygonal shapes may be used. For each area where mobile devices are present and are collecting pressure and location data, a localized atmospheric model for that area may be generated. In this example, only Areas B, D, E and H (602, 606, 608, 614) have mobile devices 100 collecting pressure and location data. Therefore, in this example, atmospheric models are generated only for Areas B, D, E, and H. No models are generated for Areas A, C, F, G, and I. A composite model (i.e. mosaic of models) may thus be created or formed by joining or merging the models for Areas B, D, E and H. Although in this example, the areas (B, D, E and H) are contiguous and adjoining, the composite model may, in other embodiments, be created from a patchwork or mosaic of disparate (non-contiguous or non-adjoining) areas.

In one implementation, the map areas 600-616 are sized to correspond with Maplets or map tiles of a digital map database. For example, some digital maps are divided into Maplets or map tiles for different zoom levels. Each area may be selected to correspond to one of these map tiles (assuming there is a map tile size at one zoom level that is approximately the desired size for model generation). In other embodiments, the localized area for model generation is unrelated to the map tiles or tile size of any map database.

Composite atmospheric models for various regions, cities, districts, counties, states, provinces, countries, etc. may be shared or pushed to a centralized server, server cluster, server farm, or to the cloud for access by other mobile devices, cloud-based applications or web services. This technology can thus provide a mobile and potentially global network of pressure-sensing mobile devices from which real-time pressure, temperature and weather information can be determined.

Computer-Readable Medium

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer processor-implemented method for delivering content to a handheld mobile device, the method comprising:
receiving pressure data and location data collected at each of a plurality of locations in a defined area remote to said processor by one or more handheld mobile devices, the handheld mobile devices being different to said processor and being remotely located relative to said processor and each having a pressure sensor and a position-determining subsystem, the location data including altitude data;
determining a current location of a first of the one or more handheld mobile devices in the defined area;
generating localized atmospheric conditions using the received data, and one or more of ambient temperature, pressure, and weather conditions from an atmospheric model at the determined current location of the first of the one or more handheld mobile devices, the atmospheric model based on the received pressure data and location data, the determined current location being remote to said processor;
using the generated localized atmospheric conditions to determine content data relevant to the defined area, the content data being data other than said localized atmosphere conditions; and
transmitting the determined content data to the first of the one or more mobile devices in the defined area for display on the handheld mobile device, the content data associated with one or more of the ambient temperature, the pressure and the weather at the determined current location.

2. The method as claimed in claim 1 wherein generating the atmospheric model comprises:
determining an Above Mean Sea Level (AMSL) altitude using a position-determining subsystem;
determining a pressure altitude using the pressure sensor;
calculating a difference between the pressure altitude and the AMSL altitude; and
calculating a temperature at sea level based on the AMSL altitude and the pressure altitude.

3. The method as claimed in claim 1 further comprising transmitting the generated ambient temperature for display on the mobile device.

4. The method as claimed in claim 1 further comprising transmitting the weather conditions for display on the mobile device.

5. The method as claimed in claim 1 comprising collecting pressure data and location data using a plurality of mobile devices located at the plurality of locations.

6. The method as claimed in claim 2 wherein determining the temperature at sea level comprises:
performing a linear regression on an equation AMSL altitude=offset+ScaleFactor*PressureAltitude to solve for the offset and the ScaleFactor; and
calculating the temperature at sea level as 1-ScaleFactor= (T−15)/3.

7. The method as claimed in claim 2 wherein collecting pressure data and location data comprises collecting pressure data and location data over the predetermined area for a predetermined period of time and then pre-filtering AMSL altitude measurements based on accuracy and time consistency with pressure changes.

8. The method as claimed in claim 2 wherein determining the AMSL altitude comprises obtaining a GPS altitude reading from a GPS receiver in the mobile device and converting the GPS altitude to the AMSL altitude.

9. The method as claimed in claim 6 further comprising generating the atmospheric model for pressure based on the AMSL altitude and temperature at altitude using a lapse rate of 1.98 C/1000 ft (6.5 C per km).

10. A non-transitory computer-readable medium comprising computer instructions stored therein for causing a computer processor to:
receive pressure data and location data collected at each of a plurality of locations in a defined area remote to said processor by one or more handheld mobile devices, the handheld mobile devices being different to said processor and being remotely located relative to said processor and each having a pressure sensor and a position-determining subsystem, the location data including altitude data;

determine a current location of a first of the one or more handheld mobile devices in the defined area;

generate localized atmospheric conditions using the received data, and one or more of ambient temperature, pressure, and weather conditions from an atmospheric model at the determined current location of the first of the one or more handheld mobile devices, the atmospheric model based on the received pressure data and location data, the determined current location being remote to said processor;

use the generated localized atmospheric conditions to determine content data relevant to the defined area, the content data being data other than said localized atmospheric condition; and transmit the determined content data to the first of the one or more handheld mobile devices in the defined area for display on the handheld mobile device, the content associated with one or more of the ambient temperature, the pressure and the weather at the determined current location.

11. The computer-readable medium as claimed in claim 10 comprising code to cause the processor to:
determine an Above Mean Sea Level (AMSL) altitude using a position-determining subsystem;
determine a pressure altitude using the pressure sensor;
calculate a difference between the pressure altitude and the AMSL altitude; and
calculate a temperature at sea level based on the AMSL altitude and the pressure altitude.

12. The computer-readable medium as claimed in claim 11 comprising code to cause the processor to:
perform a linear regression on an equation AMSL altitude=offset+ScaleFactor*PressureAltitude to solve for the offset and the ScaleFactor; and
calculate the temperature at sea level as 1-ScaleFactor=(T−15)/3.

13. A handheld mobile device comprising:
a pressure sensor for collecting pressure data;
a position-determining subsystem for generating location data including altitude data;
a processor operatively coupled to a memory to:
generate localized atmospheric conditions including one or more of ambient temperature, pressure and weather conditions from an atmospheric model for a current location in a defined area of the handheld mobile device based on the pressure data and the location data;
transmit the pressure data and the location data to a remote processor, the remote processor being located remotely relative to said processor;
receive content data from the remote processor, the received content data being relevant to the defined area associated with the generated localized atmospheric conditions for the defined area and being data other than said localized atmospheric conditions; and
display on the handheld mobile device, the received content data associated with one or more of the ambient temperature, the pressure and the weather at the current location.

14. The mobile device as claimed in claim 13 wherein the processor is configured to:
determine an Above Mean Sea Level (AMSL) altitude using a position-determining subsystem;
determine a pressure altitude using the pressure sensor;
calculate a difference between the pressure altitude and the AMSL altitude; and
calculate a temperature at sea level based on the AMSL altitude and the pressure altitude.

15. The mobile device as claimed in claim 13 wherein the processor is configured to determine the AMSL altitude by obtaining a GPS altitude reading from a GPS receiver in the mobile device and to convert the GPS altitude to the AMSL altitude.

16. The mobile device as claimed in claim 13 wherein the processor is configured to display the ambient temperature on the mobile device.

17. The mobile device as claimed in claim 13 wherein the processor is configured to display the weather conditions on the mobile device.

18. The mobile device as claimed in claim 14 wherein the processor is configured to perform a linear regression on an equation AMSL altitude=offset+ScaleFactor*PressureAltitude to solve for the offset and the ScaleFactor and to calculate the temperature at sea level as 1-ScaleFactor=(T−15)/3.

* * * * *